United States Patent [19]

Lessard

[11] 3,966,181
[45] June 29, 1976

[54] SUSPENSION SPRING ADJUSTER

[75] Inventor: Normand Lessard, Valcourt, Canada

[73] Assignee: Bombardier Limited, Valcourt, Canada

[22] Filed: Dec. 2, 1974

[21] Appl. No.: 528,897

[30] Foreign Application Priority Data
Mar. 11, 1974 Canada .................................. 194591

[52] U.S. Cl. .................................. 267/58; 180/5 R; 305/24; 305/27
[51] Int. Cl.² .................................................. F16F 1/16
[58] Field of Search ................ 267/58, 59, 615, 57; 180/5 R; 305/27, 24

[56] References Cited
UNITED STATES PATENTS
2,134,515 10/1938 Hoskyns .............................. 267/58
3,489,403 1/1970 Kieffer ............................... 267/615
3,829,120 8/1974 Redding, Jr. ........................ 267/58

*Primary Examiner*—James B. Marbert

[57] ABSTRACT

In a snowmobile suspension system, it is known to provide suspension system adjustment with an eye bolt-nut combination which provides an increase or decrease in tension in a torsion spring which acts on a suspension arm of the suspension system. This invention replaces the eye bolt-nut combination with a rotatably mounted cam having surface portions in the form of channels arranged at different distances from its axis. A lateral arm of the torsion spring is accommodated within these channels and upon rotation of the cam, torsion spring tension is increased or decreased which provides the necessary stiffness to the suspension system.

17 Claims, 4 Drawing Figures.

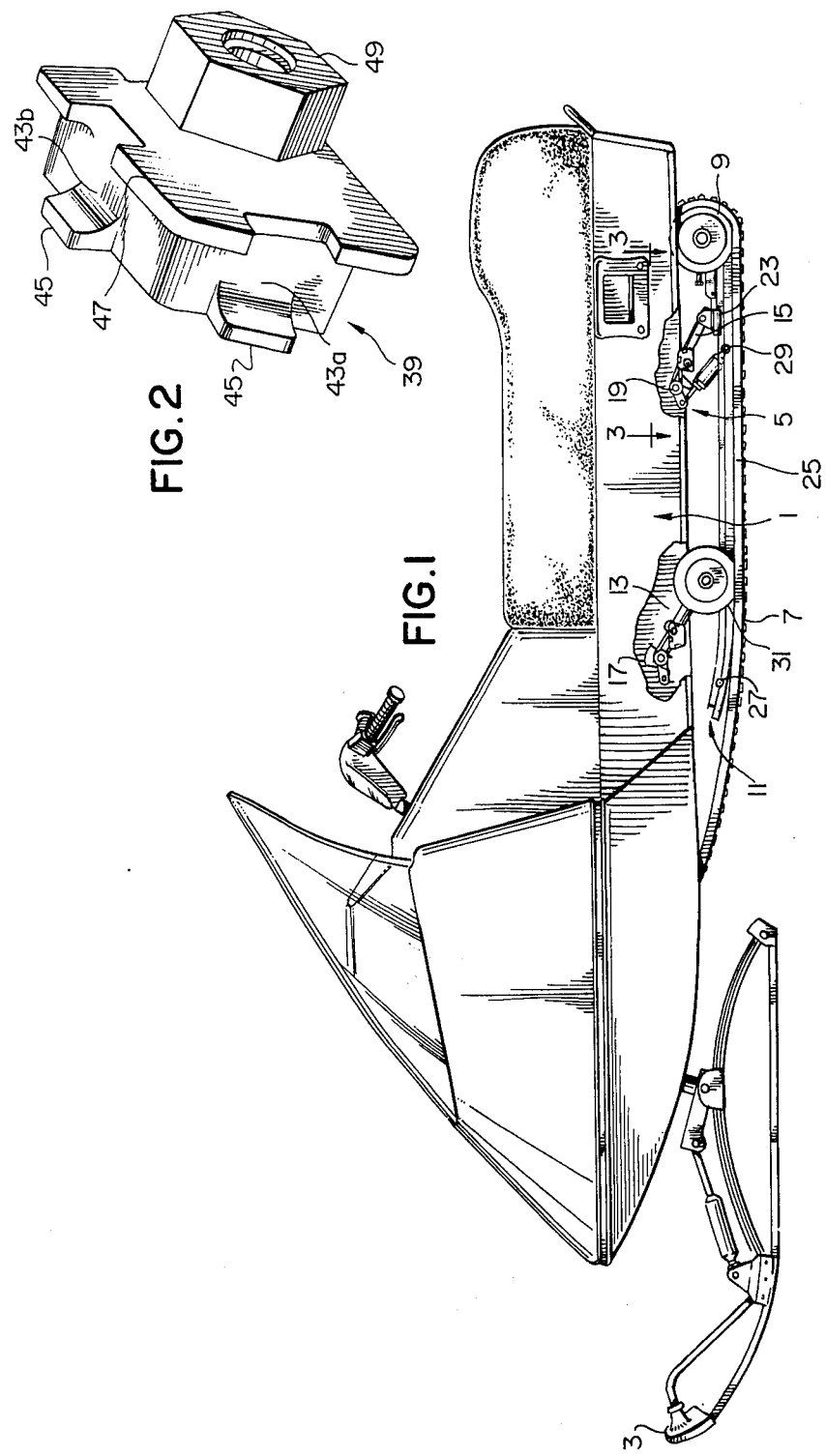

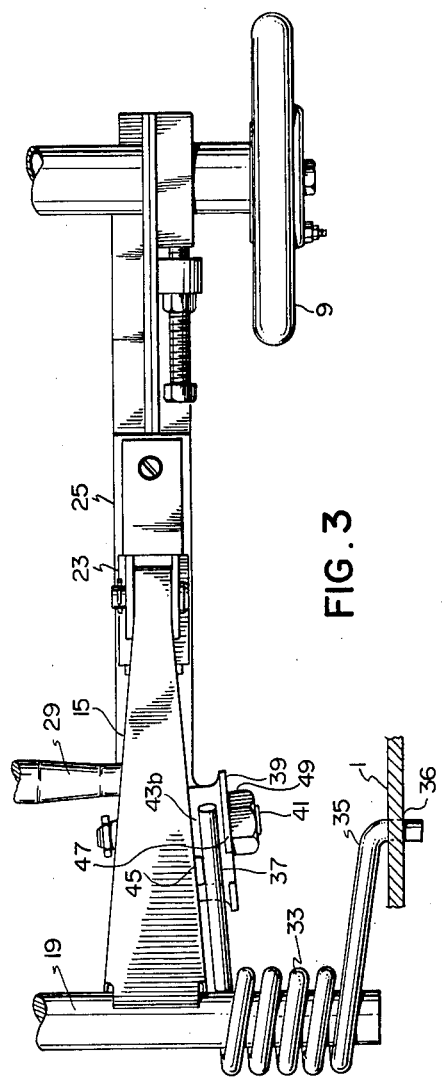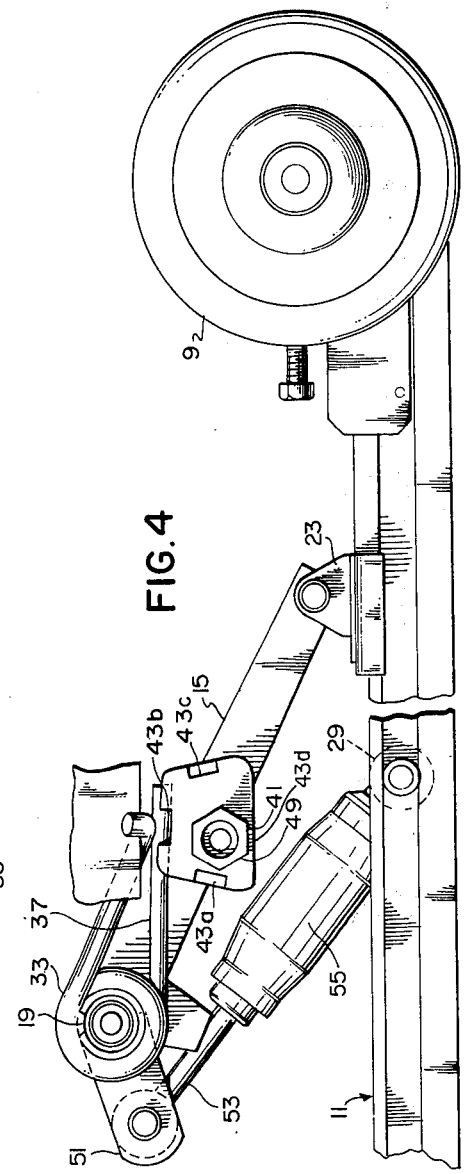

SUSPENSION SPRING ADJUSTER

FIELD OF THE INVENTION

This invention relates to a spring adjuster used in a suspension system for a snowmobile.

DESCRIPTION OF THE PRIOR ART

Snowmobile slide suspension systems generally consist of suspension arms pivotally mounted on a shaft rotatably connected to the frame of the snowmobile and a slide frame comprising a pair of laterally spaced longitudinal skids interconnected transversely on opposite sides of the machine, the skids being in sliding contact with an endless belt which provides the drive for the snowmobile. In one arrangement, there are four such arms, a front pair located on opposite sides of the snowmobile and pivotally connected to the slide, and a rear pair, each of which is connected to a bracket capable of limited longitudinal movement relative to the associated skid while the snowmobile is in motion. The system may include shock absorbers to provide damping as the suspension arm shafts rotate under the action of the slide on the suspension arms when the snowmobile is in operation. Providing tension to the suspension arms are torsion springs mounted coaxially around the suspension arms shafts and connected on one end to a suspension arm and on the other end to the frame. Because of various operating requirements, however, it is the practice to provide means for adjustment of the force of the torsion springs in order to stiffen or soften the ride characteristics of the snowmobile.

The torsion spring adjustment has previously been carried out in one arrangement through the use of an eyebolt-nut combination, the eyebolt being attached between a lateral arm of the torsion spring and the suspension arm. By rotating the nut, the lateral arm of the spring could be moved to vary the static force in the spring thereby producing an increase or decrease in ride stiffness. This method of adjustment, however, manifested inherent difficulties. Since at least two, and more commonly four, torsion springs were provided, an identical adjustment had to be made on each spring, and this was difficult to achieve with a rotating nut. Another problem was the additional cost required to form on the lateral arm of the spring a hook which would remain within the eyebolt under operating conditions. Furthermore, stress concentration arose in the formed arm at the point of contact with the eyebolt sometimes causing fracture of the torsion spring, and the short length of the lateral arm involved led to high forces acting on the suspension arm through the eyebolt, which in some cases also caused fracture of the arm under operating conditions. An additional problem was damage to and corrosion of the threaded connection, which problem was amplified by the conditions under which snowmobiles operated.

SUMMARY OF THE INVENTION

To alleviate these problems, the present invention contemplates a cam rotatably mounted on the suspension arm and having a series of surfaces located at progressively greater distances from its axis. The lateral arm of the torsion spring is in contact with one of these cam surfaces, and by rotating the cam, the arm of the spring may be engaged by another cam surface to be selectively displaced in order to obtain an increase or decrease in static torsion spring force, which will accordingly vary the stiffness of the suspension.

By observation of each cam displacement, it is relatively easy to obtain identical adjustment for the torsion springs on opposite sides of the vehicle. Further, it is not necessary to provide a formed end for the torsion spring arm in contact with the cam, nor is the stress concentration in the lateral arm of the spring unduly high.

The cam is preferably molded from a suitable plastic material such as nylon and may include a fitting facing laterally of the snowmobile which may be readily engaged and rotated by a common sprak plug wrench which is a usual tool carried on snowmobiles.

According to one aspect of the invention, therefore, there is provided a snowmobile suspension system comprising track engaging elements to support a snowmobile upon a ground engaging portion of a snowmobile track belt, suspension arm means mounted on a frame of the snowmobile and carrying said track engaging elements and torsion spring means acting on said suspension arm means and operative to urge said track engaging elements into engagement with said track portion, said torsion spring means including a lateral arm engaging a part of said suspension system and movable to vary the force of said torsion spring means as the track engaging elements more vertically, the improvement comprising said part being in the form of a rotatably mounted cam which includes a plurality of surface portions selectively engageable with said lateral arm upon rotation of said cam, each said surface portion being effective to retain said lateral arm at a different position thereby to vary the loading in said torsion spring means.

According to a further aspect of the invention, there is provided a spring adjusting device comprising a cam adapted for rotatable mounting about an axis therein and defining a plurality of surface portions angularly spaced about said axis, said plurality of surface portions being located in a common plane transverse to said axis, each said surface portion defining a channel section extending in said plane at a different radial distance from said axis and open in a radially outwards direction with respect to said axis.

BRIEF DESCRIPTION OF THE DRAWINGS

In the drawings, which illustrate a preferred embodiment of the invention,

FIG. 1 is a side view of a snowmobile showing the lower portion of the suspension system, FIG. 2 is a perspective view of a cam incorporated in the suspension shown in FIG. 1, FIG. 3 is an enlarged plan view of a part of the suspension system taken along line III—III of FIG. 1, and FIG. 4 is a side view of the suspension system part shown in FIG. 3.

DESCRIPTION OF THE PREFERRED EMBODIMENT

FIG. 1 shows a snowmobile comprising a frame 1 supported at its forward end on a pair of steerable skis 3 and at its rear end through a suspension system 5 on an endless track 7 driven by drive sprockets (not shown) which passes over a pair of rear idler sprockets 9 carried on the rear end of a slide frame 11 of the suspension system 5.

The suspension system 5 comprises forward and rearward pairs of transversely spaced suspension arms 13, 15 respectively, mounted on forwardly and rearwardly located shafts 17, 19 pivotally supported in the frame 1. While only these suspension arms 13, 15 on the right of the snowmobile are shown, it will be realised that corresponding arms exist on the opposite side of the machine. The front and rear suspension arms 13, 15 extend downwardly and rearwardly as shown the front arms being pivotally connected to the slide at 21, and the rear suspension arm being pivotally connected to a bracket 23 which is slidable longitudinally to a limited extent on a slide rail 25 of the slide frame 11. The slide frame 11 of the suspension system 5 comprises a pair of such slide rails 25 located on opposite sides of the snowmobile and transversely interconnected as by laterally extending shafts 27, 29 (rearward shaft 29 shown dotted in FIG. 4) located near the front and rear of the slide frame. The slide frame 11 contacts in sliding engagement the ground engaging portion of the track 7, one or more pair of idler wheels 31 being provided on the frame 11 to reduce frictional engagement with the track. In known manner, resilient means is provided to press the slide frame downwards and support the weight of the rear end of the snowmobile upon the track 7.

A crank arm 51 (FIG. 4) is rigidly connected to the rear shaft 19. Pivotally connected to crank arm 51 is the piston rod 53 of a telescopic shock absorber 55. The body of the shock absorber is pivotally connected to slide rail shaft 29 (shown dotted in FIG. 4) which extends between the slides composing the slide frame as described.

FIGS. 3 and 4 show the resilient means which comprises a torsion spring 33 mounted around each end of the rear suspension arm shaft 19 in a series of coils terminating in two radially extending arms, a first arm 35 shown in contact with the frame 1 at 36 in FIG. 3 and a second arm 37 shown in contact with a cam 39 rotatably mounted on the suspension arm 15 by a pin connection 41. It will be understood that while only the cams mounted on the rear suspension arms are described, similar cams also are mounted on the front suspension arms.

The cam 39, as best shown in FIGS. 2 and 4, comprises four peripheral surfaces, which are in the shape of channels 43a, 43b, 43c and 43d defined by lateral radially extending sidewalls 45, 47. As shown in FIGS. 3 and 4, the arm 37 of the spring 33 is straight and is received in the channel 43b, being pressed into engagement therewith by the force of the spring. Due to the relative positions of the channel 43b and the pin connection 41, the arm 37 is thus retained at a fixed distance from the axis of the pin 41 and acts therethrough to urge the associated suspension arm 15 downwardly. The lateral arm 37 in the channel 43b is effectively restrained from lateral movement by the channel sidewalls 45, 47.

A hexagonal head 49 may be provided on the cam 39 with its axis coincident to that of the cam. Such a head is formed integrally with the cam where the latter is molded from a suitable plastic material, such as nylon. The sidewalls 45, 47 of the cam are in interrupted form to facilitate molding, as best shown in FIG. 2. The hexagonal shape of the head 49 is designed to fit a spark plug socket (not shown) to facilitate rotation of the cam 39 when an adjustment in ride stiffness is desired. Each channel 43a, 43b, 43c, 43d in the cam 39 causes the arm 37 to be positioned at a different radial distance from the axis of the cam. Since each cam position causes a different loading in the torsion spring, a change in ride stiffness is obtained. Adjustment to the cam on one side of a snowmobile necessitates adjustment to the cam on the corresponding opposite suspension arm, although the cams on the front and rear suspension arms on the same side of the side of the snowmobile, need not have identical positions of adjustment.

What I claim as my invention is:

1. In a snowmobile suspension system comprising track engaging elements to support a snowmobile upon a ground engaging portion of a snowmobile track belt, suspension arm means mounted on a frame of the snowmobile and carrying said track engaging elements and torsion spring means acting on said suspension arm means and operative to urge said track engaging elements into engagement with said track portion, said torsion spring means including a lateral arm engaging a part of said suspension system and movable to vary the force of said torsion spring means as the track engaging elements move vertically, the improvement comprising said part being in the form of a rotatably mounted cam which includes a plurality of surface portions selectively engageable with said lateral arm upon rotation of said cam, each said surface portion being effective to retain said lateral arm at a different position thereby to vary the loading in said torsion spring means.

2. A snowmobile suspension system as claimed in claim 1 wherein said cam is mounted on said suspension arm means.

3. A snowmobile suspension system as claimed in claim 2 wherein said torsion spring means is mounted to act between said suspension arm means and said snowmobile frame.

4. A snowmobile suspension system as claimed in claim 1 wherein said cam is rotatable about a horizontal axis transverse to the longitudinal axis of the snowmobile and said plurality of surface portions are angularly spaced about said horizontal axis and are located at different radial distances therefrom.

5. A snowmobile suspension system as claimed in claim 4 wherein each of said plurality of surface portions defines a channel, said channels extending transversely to said axis and being adapted to receive said lateral arm.

6. A snowmobile suspension system as claimed in claim 4 wherein said cam includes a fitting co-axial with said horizontal axis whereby to facilitate rotation of said cam.

7. A snowmobile suspension system as claimed in claim 6 wherein said fitting is adapted to receive a suitable hand tool.

8. A snowmobile suspension system as claimed in claim 7 wherein said fitting is hexagonal and said tool is a wrench commonly used to remove spark plugs.

9. A snowmobile suspension system as claimed in claim 2 wherein said track engaging elements comprise a substantially horizontal slide in sliding contact with said ground engaging portion of the snowmobile track belt and said suspension arm means are pivotally attached to said slide.

10. A snowmobile suspension system as claimed in claim 1, wherein said suspension arm means is pivotally connected to said snowmobile frame and said track engaging elements, and said torsion spring means has an axis which substantially coincides with said pivotal connection between said suspension arm means and said snowmobile frame.

11. A snowmobile suspension system as claimed in claim 1, wherein said cam is molded from a suitable plastic material.

12. A snowmobile suspension system comprising a slide supporting a snowmobile upon a ground engaging portion of a snowmobile track belt, a respective suspension arm pivotally interconnecting a respective portion of said slide to the frame of said snowmobile, a torsion spring acting between said frame and each said suspension arm to urge said slide into engagement with said track belt, each said torsion spring having a lateral arm engaging a cam rotatably mounted on a respective suspension arm about a horizontal axis transverse to the longitudinal axis of the snowmobile, said arm being movable to vary the force in said torsion spring as the slide moves vertically, said cam including a plurality of surface portions angularly spaced about said horizontal axis and located at different radial distances therefrom, each said surface portion defining a channel selectively engageable with said lateral arm upon rotation of said cam to retain said lateral arm at a different radial position from said axis and thereby to vary the loading in said torsion spring.

13. A spring adjusting device comprising a cam adapted for rotatable mounting about an axis therein and defining a plurality of surface portions angularly spaced about said axis, said plurality of surface portions being located in a common plane transverse to said axis, each said surface portion defining a straight channel section extending tangentially in said plane at a different radial distance from said axis and open in a radially outwards direction with respect to said axis.

14. A spring adjusting device as claimed in claim 13 wherein said device includes a fitting co-axial with said axis whereby to facilitate rotation of said cam.

15. A device as claimed in claim 14 wherein said fitting is hexagonal and adapted to receive a tool commonly used to remove spark plugs.

16. A spring adjusting device as claimed in claim 13 wherein said cam is molded from a suitable plastic material.

17. A device as claimed in claim 13, wherein said channel section comprises complimentary opposing walls extending transverse to said axis, one of said walls being interrupted when opposing the other of said walls whereby to facilitate molding.

* * * * *